G. C. DAVIS.
VALVE.
APPLICATION FILED FEB. 21, 1912.
1,057,944.
Patented Apr. 1, 1913.
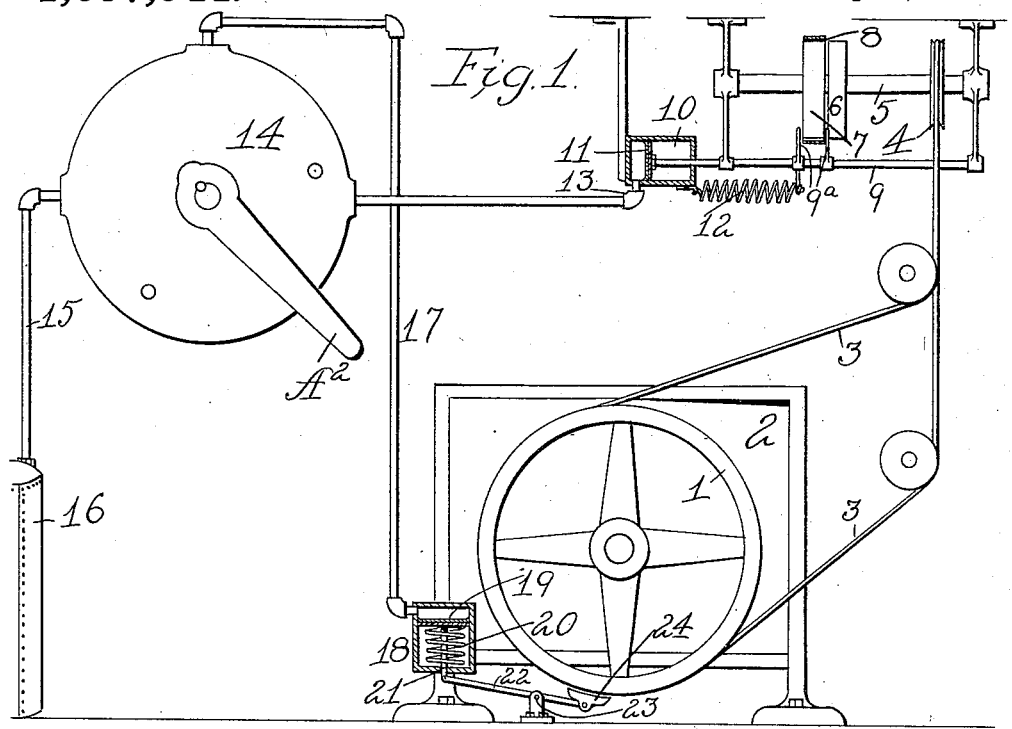
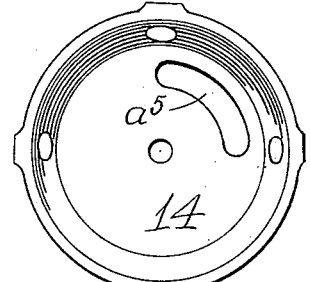
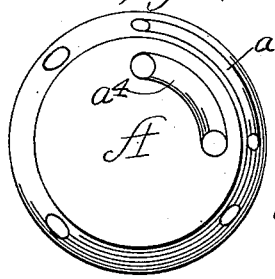
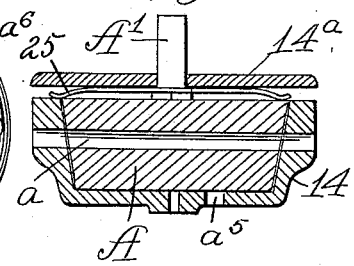
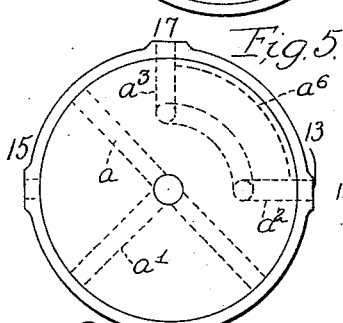
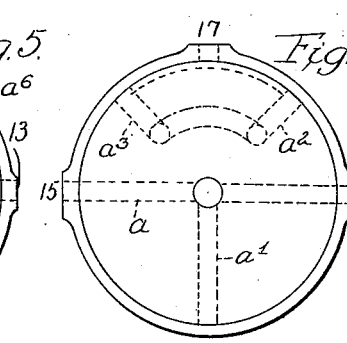
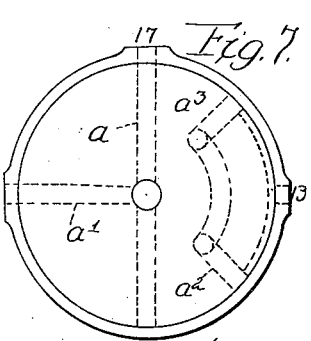
Inventor
George C. Davis.

UNITED STATES PATENT OFFICE.

GEORGE C. DAVIS, OF LOUISVILLE, KENTUCKY, ASSIGNOR OF ONE-THIRD TO JOHN S. DAVIS AND ONE-THIRD TO THOMAS GRADY, OF LOUISVILLE, KENTUCKY.

VALVE.

1,057,944.  Specification of Letters Patent.  Patented Apr. 1, 1913.

Application filed February 21, 1912. Serial No. 679,210.

*To all whom it may concern:*

Be it known that I, GEORGE C. DAVIS, citizen of the United States, residing at Louisville, Kentucky, have invented certain new and useful Improvements in Valves, of which the following is a specification.

My present invention relates to improvements in valves for controlling the power applied to driving machinery and has been designed by me more especially for use in connection with printing machinery, though by no means limited to such specific use.

The object of the invention is to provide an extremely simple, durable and efficient valve by means of which, when power is to be cut off from the press or other piece of driven machinery, this may be easily and quickly accomplished, as also the application of a brake to instantaneously stop the machine.

With this and other objects in view the invention includes the novel features of construction and arrangement and combination of parts as defined by the appended claims.

The invention is illustrated by the accompanying drawing, in which:

Figure 1 is a diagrammatic view of my improved valve and the apparatus in connection with which it is used. Figs. 2 to 7 are detail views.

Referring by reference characters to this drawing, the numeral 1 designates the belt pulley of a machine indicated at 2, such as a printing machine, which is designed to be driven by a belt 3 from a pulley 4 on a counter shaft 5 which, in turn, receives its power through belt pulley 6 fast on the shaft 5. Alongside fast pulley 6 is loose pulley 7, and the belt, indicated at 8, is designed to be shifted from one to the other by shifter fingers 9ª carried by shifter rod 9. The end of this rod projects into a compressed air cylinder 10, where it is provided with a piston 11, and the rod is normally held and tends automatically to assume a position operating to maintain the belt on the loose pulley by reason of the tension of spring 12. The rear end of the cylinder 10 is connected by a pipe 13 with a valve casing 14, which valve casing is also connected by a pipe 15 with a source of air under pressure, as, for example, the tank 16. The valve casing 14 also has connected therewith a pipe 17 which leads to the upper or rear end of a cylinder 18 which has a piston 19 therein normally pressed upward by a spring 20. This piston has a rod 21 connected to one end of a lever 22, fulcrumed at 23, and carrying at its opposite end a brake block 24 designed, when forced against the pulley 1 (or against the belt thereon), to arrest the motion of the machine.

The valve casing has an inside annular wall of truncated conical form, and said casing is preferably formed sufficiently heavy to enable the pipes to be screwed thereinto without danger of distorting the same. It is provided with a removable cover 14ª, and within the casing is located the valve A, also of truncated conical shape, which is provided with a stem A' projecting through the cover and having a handle A² for turning the same.

The valve is provided with a passage $a$ extending diametrically through it and a branch passage $a'$ extending from the center of the passage $a$ outward at right angles thereto. The pipes 13 and 15 communicate with diametrically opposite sides of said casing, and the pipe 17 with a point half way between and in the same plane with the passages $a$ and $a'$. Thus when the valve is rotated to bring the ends of the passage $a$ in alinement with the pipes 13 and 15, as shown in Fig. 6, compressed air is admitted to the cylinder 10 and the piston 11 forced outward against the tension of the spring to shift the belt from the loose to the fast pulley, in which position it will be held as long as the valve remains unmoved. When, however, the valve is rotated to bring the passage $a'$ in alinement with the compressed air pipe 15, the admission of compressed air to pipe 13 and cylinder 10 is cut off, while pipe 15 is placed in communication with pipe 17, as indicated in Fig. 7, with the result that air is admitted to the cylinder 18, forcing the piston 19 downwardly and applying the brake. Simultaneously, of course, with this movement, means must be provided for exhausting air from the cylinder 10 in the rear of the piston, and similarly when compressed air has been admitted to cylinder 10, air must be allowed to exhaust from cylinder 18. My simple form of valve enables me to do this without providing extra piping, and in order to accomplish the exhaust, I provide the valve with the exhaust ports $a^2$ and $a^3$, arranged in the side of the valve opposite the passage $a'$, and all approximately ninety degrees from each other, and in a plane adapting them, when the valve is rotated, to be brought into communication with the ends of the pipes 13 and 17. They are connected at their inner ends with the ends of a curved passage or channel formed in the bottom of the valve, as indicated at $a^4$, which is in alinement with an exhaust port $a^5$ in the valve casing, this construction allowing both ports $a^2$ and $a^3$ to simultaneously communicate with the exhaust port, and also allowing a considerable amount of rotary movement to the valve while yet maintaining one or the other of pipes 13 and 14 in communication with the exhaust. The ports $a^2$ and $a^3$ are further connected by a port $a^6$ in the circumferential wall of the valve. By this construction, when the valve has been turned into the position shown in Fig. 5 with the ports $a$ and $a'$ all out of register with the pipes 13, 15 and 17, compressed air from pipe 15 is cut off, while pipes 13 and 17 are in communication through ports $a^2$, $a^3$, $a^4$ and $a^5$ with the atmosphere, and the machine is in a position of rest with the belt on the loose pulley and the brake unapplied.

When the valve is moved to the position shown in Fig. 6, with the passage $a$ connecting pipes 15 and 13, air is admitted to the pipe 13 and cylinder 10, and the belt is shifted to the fast pulley, but pipe 17 is still in communication with the atmosphere through the annular channel $a^6$ and ports $a^2$, $a^3$, and channel $a^4$ and port $a^5$, so that the brake is unapplied. If, however, it be desired to suddenly stop the machine, the valve is shifted to the position shown in Fig. 7, moving the passage $a'$ into communication with the pipe 15, and passage $a$ into communication with pipe 17, in which position the pipe 13 is in communication with the exhaust passages, allowing the air in the cylinder 10 to exhaust to the atmosphere, by which time the spring will cause the belt shifter to move the belt to the loose pulley, and the brake will be applied. It will be noticed that when the valve is shifted to this last named position, owing to the length of the channel $a^6$ the pipe 13 is connected with the atmosphere considerably before the passages $a$ and $a'$ register with the pipes 17 and 15, respectively, thus allowing time for the belt shifter to shift the belt to the loose pulley before the brake is applied. In order to keep the wall of the valve pressed tight against its seat, I prefer to interpose between the valve and the cover of the valve case a spider-shaped spring, as indicated at 25.

I claim as my invention:

1. A valve casing having an inlet for fluid under pressure, a diametrically opposite outlet port adapted to be connected to a pneumatic device, and a second outlet port at 90° from said inlet and first-named outlet port adapted to be connected to a second pneumatic device, and a rotary valve therein having a passage diametrically through it and having a radial passage at ninety degrees thereto, and a pair of exhaust passages ninety degrees apart located in the portion of the valve opposite said radial passage, said exhaust passages joining in a common exhaust port.

2. A valve casing having an inlet for fluid under pressure, a diametrically opposite outlet port adapted to be connected to a pneumatic device, and a second outlet port at 90° from said inlet and first-named outlet port adapted to be connected to a second pneumatic device, and a rotary valve therein having a passage diametrically through it and having a radial passage at ninety degrees thereto, and a pair of exhaust passages ninety degrees apart located in the portion of the valve opposite said radial passage, said exhaust passages joining in a common elongated exhaust port, and said valve having a circumferential channel joining the outer ends of the radial passages.

In testimony whereof, I affix my signature in presence of two witnesses.

GEORGE C. DAVIS.

Witnesses:
ITHIAN COX,
JOSEPH H. BRONGER.

---

Copies of this patent may be obtained for five cents each, by addressing the "Commissioner of Patents, Washington, D. C."